US012754948B2

(12) United States Patent
Gordon et al.

(10) Patent No.: US 12,754,948 B2
(45) Date of Patent: Oct. 6, 2026

(54) SYSTEM AND METHOD FOR COLLABORATIVE KNOWLEDGE MANAGEMENT PRUNING USING LARGE LANGUAGE MODELS

(71) Applicant: TOYOTA RESEARCH INSTITUTE, INC., Los Altos, CA (US)

(72) Inventors: Matthew P. Gordon, Berkeley, CA (US); Arjun Bhargava, Brooklyn, NY (US); Flora Miao Chen, San Francisco, CA (US); Robert Brian Mason, Irvine, CA (US); Kordel France, Allen, TX (US); Ravi Chandu Ummadisetti, Plano, CA (US); Kuo Sung Swei, Allen, TX (US)

(73) Assignees: TOYOTA RESEARCH INSTITUTE, INC., Los Altos, CA (US); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 68 days.

(21) Appl. No.: 18/801,258

(22) Filed: Aug. 12, 2024

(65) Prior Publication Data

US 2026/0044556 A1 Feb. 12, 2026

(51) Int. Cl.
*G06F 16/383* (2019.01)
*G06F 16/16* (2019.01)

(52) U.S. Cl.
CPC .......... *G06F 16/383* (2019.01); *G06F 16/162* (2019.01)

(58) Field of Classification Search
None
See application file for complete search history.

(56) References Cited

U.S. PATENT DOCUMENTS

| | | | | |
|---|---|---|---|---|
| 5,701,469 | A | 12/1997 | Brandli et al. | |
| 6,954,754 | B2 | 10/2005 | Peng | |
| 11,468,059 | B2 | 10/2022 | Watzke et al. | |
| 11,544,217 | B2 | 1/2023 | Deshpande et al. | |
| 11,841,835 | B2 | 12/2023 | Fink et al. | |
| 2008/0294610 | A1 * | 11/2008 | Strosaker ................ | G06F 16/36 |

(Continued)

FOREIGN PATENT DOCUMENTS

| | | | | |
|---|---|---|---|---|
| AU | 2014236646 A1 * | 10/2015 | ............. | G06F 40/00 |
| DE | 102004029673 A1 | 1/2006 | | |

OTHER PUBLICATIONS

Hoseini et al. Towards LLM-augmented Creation of Semantic Models for Dataspaces. Second International Workshop on Semantics in Dataspaces. May 2024, pp. 1-15. (Year: 2024).*

(Continued)

*Primary Examiner* — Tuankhanh D Phan
(74) *Attorney, Agent, or Firm* — SEYFARTH SHAW LLP

(57) ABSTRACT

A method for collaborative knowledge management pruning is described. The method includes feeding, in response to a user search request, retrieved articles from an enterprise knowledge database to a large language model (LLM). The method also includes performing, by the LLM, a hierarchical search-based comparison of the retrieved articles to provide an LLM-based identification of out-of-date articles. The method further includes flagging out-of-date articles for user review. The method also includes removing, in response to the user, identified out-of-date articles from the enterprise knowledge database.

18 Claims, 5 Drawing Sheets

(56) References Cited

U.S. PATENT DOCUMENTS

| | | | |
|---|---|---|---|
| 2023/0274094 | A1 | 8/2023 | Tunstall-Pedoe et al. |
| 2024/0012642 | A1 | 1/2024 | Kuan et al. |

OTHER PUBLICATIONS

Moller. The Semantic Web vs ChatGPT. Mar. 2024, pp. 1-4. https://www.linkedin.com/pulse/semantic-web-vs-chatgpt-jakob-møller-cmahf/. (Year: 2024).*

Zhang et al. Automatic Chain of Thought Prompting in Large Language Models. The Eleventh International Conference on Learning Representations, 2022, pp. 1-32. (Year: 2022).*

AU-2014236646-A1.*

Morante, et al.,"Modality and Negation: an Introduction to the Special Issue," Computational Linguistics, vol. 38, Issue 2, Jun. 2012.

Kaikhah, et al., "Automatic Text Summarization with Neural Networks", Second IEEE International Conference on Intelligent Systems, Jun. 2004.

Deußer, et al., "Contradiction Detection in Financial Reports," Article Ottawa vs. the Equator by the Ottawa Citizen, Jun. 20, 2012.

Liu, et al., "Summary of ChatGPT-Related Research and Perspective Towards the Future of Large Language Models," Meta-Radiology, vol. 1, Issue 2, Sep. 2023.

Li, et al, "Contradiction Detection with Contradiction-Specific Word Embedding," Algorithms Article, Jan. 18, 2017.

* cited by examiner

SYSTEM AND METHOD FOR COLLABORATIVE KNOWLEDGE MANAGEMENT PRUNING USING LARGE LANGUAGE MODELS

BACKGROUND

Field

Certain aspects of the present disclosure relate to machine assisted analysis and, more particularly, to a system and method for collaborative knowledge management pruning using large language models.

BACKGROUND

A frequent problem in enterprise knowledge management is pruning out-of-date information. It is common for companies to aggregate substantial amounts of human-written knowledge articles (e.g., in the form of a knowledge management database). Over time, some articles fall out of date and are no longer true due to changes in the products or organization. For example, a software application programming interface (API) may change, and old documents that reference that API may become out of date. Identifying old/out-of-date information can be time intensive and costly. Most companies do not allocate staff to knowledge management, which results in stale information remaining, causing trust in the knowledge management database to reduce over time, resulting in degraded search results.

A system and method for collaborative knowledge management pruning is desired.

SUMMARY

A method for collaborative knowledge management pruning is described. The method includes feeding, in response to a user search request, retrieved articles from an enterprise knowledge database to a large language model (LLM). The method also includes performing, by the LLM, a hierarchical search-based comparison of the retrieved articles to provide an LLM-based identification of out-of-date articles. The method further includes flagging out-of-date articles for user review. The method also includes removing, in response to the user, identified out-of-date articles from the enterprise knowledge database.

A non-transitory computer-readable medium having program code recorded thereon for collaborative knowledge management pruning is described. The program code is executed by a processor. The non-transitory computer-readable medium includes program code to feed, in response to a user search request, retrieved articles from an enterprise knowledge database to a large language model (LLM). The non-transitory computer-readable medium also includes program code to perform, by the LLM, a hierarchical search-based comparison of the retrieved articles to provide an LLM-based identification of out-of-date articles. The non-transitory computer-readable medium further includes program code to flag out-of-date articles for user review. The non-transitory computer-readable medium also includes program code to remove, in response to the user, identified out-of-date articles from the enterprise knowledge database.

A system for collaborative knowledge management pruning is described. The system includes a search request monitor module to feed, in response to a user search request, retrieved articles from an enterprise knowledge database to a large language model (LLM). The system also includes an LLM search-based comparison model to perform a hierarchical search-based comparison of the retrieved articles to provide an LLM-based identification of out-of-date articles. The system further includes an out-of-date document identification module to flag out-of-date articles for user review. The system also includes out-of-date document pruning module to remove, in response to the user, identified out-of-date articles from the enterprise knowledge database.

This has outlined, broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for conducting the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
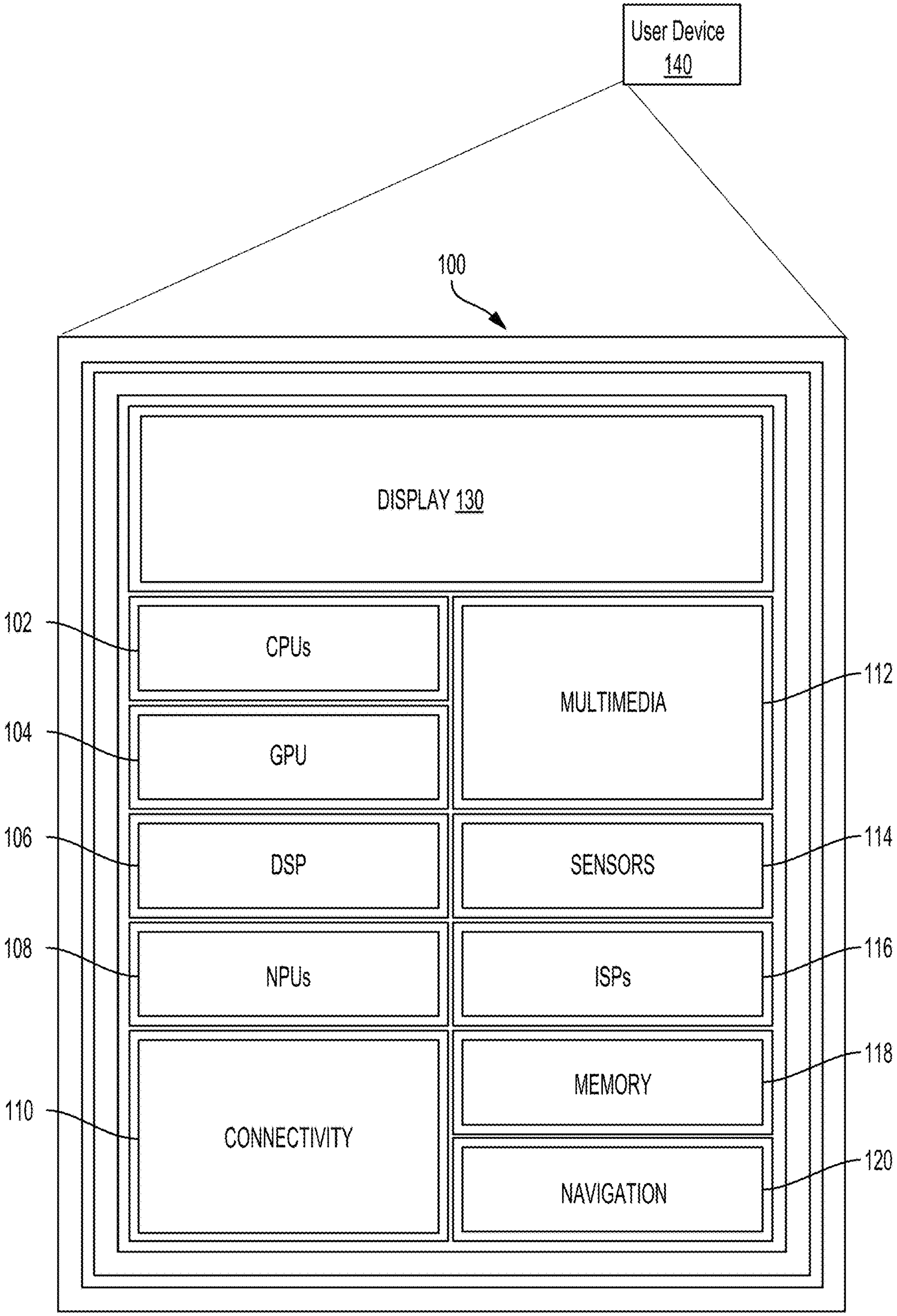
FIG. 1 illustrates an example implementation of designing a neural network using a system-on-a-chip (SOC) of a collaborative knowledge management pruning system, in accordance with aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented, or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. Any aspect of the present disclosure disclosed may be embodied by one or more elements of a claim.

Although aspects are described herein, many variations and permutations of these aspects fall within the scope of the present disclosure. Although some benefits and advantages of the preferred aspects are mentioned, the scope of the present disclosure is not intended to be limited to benefits, uses, or objectives. Rather, aspects of the present disclosure are intended to be universally applicable to different technologies, system configurations, networks, and protocols, some of which are illustrated by way of example in the figures and in the following description of the preferred aspects. The detailed description and drawings are merely illustrative of the present disclosure, rather than limiting the scope of the present disclosure being defined by the appended claims and equivalents thereof.

A frequent problem in enterprise knowledge management is pruning out-of-date information. It is common for companies to aggregate substantial amounts of human-written knowledge articles (e.g., in the form of an enterprise knowledge database). Over time, some articles fall out of date and are no longer true due to changes in the products or organization. For example, a software application programming interface (API) may change, and old documents that reference that API may become out of date. Identifying old/out-of-date information can be time intensive and costly. Unfortunately, most companies do not allocate staff to knowledge management.

Pruning out-of-date information from an enterprise knowledge database is a typical software engineer or IT professional management operation. It is common for companies to aggregate substantial amounts of human-written knowledge articles (e.g., in the form of a knowledge management system). Over time, some articles become outdated and may no longer be valid due to product or organization changes. Identifying out-of-date information in a repository of N articles is a task that scales by $N^2$ as every article is compared against every other article to find inconsistencies. Moreover, contradiction identification is usually performed by a human who manually compares the returned information. Many organizations do not have specific knowledge management article retention strategies as identifying out-of-date information can be time intensive and costly. This lack of knowledge database management may result in stale information, reduced trust in the knowledge stored, and more irrelevant search results.

Various aspects of the present disclosure are directed to a collaborative knowledge management system that uses a large language model (LLM) to prune collaborative enterprise knowledge databases. The collaborative knowledge management system utilizes a simple, structured, and prioritized collaborative knowledge management pruning method. In some implementations, the collaborative knowledge management pruning method identifies and verifies out-of-date information in a knowledge management system. In these implementations, the knowledge management system (1) analyzes the articles returned as a part of a search (e.g., document analysis is focused on searched documents rather than the entire article corpus of the knowledge management system) and (2) utilizes the LLM to perform an automated comparison of two articles for consistency.

FIG. 1 illustrates an example implementation of the system and method for a collaborative knowledge management pruning system using a system-on-a-chip (SOC) 100, according to aspects of the present disclosure. The SOC 100 may include a single processor or multi-core processors (e.g., a central processing unit (CPU) 102), in accordance with certain aspects of the present disclosure. Variables (e.g., neural signals and synaptic weights), system parameters associated with a computational device (e.g., neural network with weights), delays, frequency bin information, and task information may be stored in a memory block. The memory block may be associated with a neural processing unit (NPU) 108, a CPU 102, a graphics processing unit (GPU) 104, a digital signal processor (DSP) 106, a dedicated memory block 118, or may be distributed across multiple blocks. Instructions executed at a processor (e.g., CPU 102) may be loaded from a program memory associated with the CPU 102 or may be loaded from the dedicated memory block 118.

The SOC 100 may also include additional processing blocks configured to perform specific functions, such as the GPU 104, the DSP 106, and a connectivity block 110, which may include fourth generation long term evolution (4G LTE) connectivity, unlicensed Wi-Fi connectivity, USB connectivity, Bluetooth® connectivity, and the like. In addition, a multimedia processor 112 in combination with a display 130 may, for example, select a control action, according to the display 130 illustrating a view of a user device.

In some aspects, the NPU 108 may be implemented in the CPU 102, DSP 106, and/or GPU 104. The SOC 100 may further include a sensor processor 114, image signal processors (ISPs) 116, and/or navigation 120, which may, for instance, include a global positioning system. The SOC 100 may be based on an Advanced Risc Machine (ARM) instruction set, RISC-V, or any reduced instruction set computing (RISC) architecture, or the like. In another aspect of the present disclosure, the SOC 100 may be a server computer in communication with a user device 140. In this arrangement, the user device 140 may include a processor and other features of the SOC 100.

In this aspect of the present disclosure, instructions loaded into a processor (e.g., the CPU 102) or the NPU 108 may include code to provide a knowledge management system for collaborative pruning of an enterprise knowledge database. The instructions loaded into a processor (e.g., the NPU 108) may also include code to feed, in response to a user search request, retrieved articles from the enterprise knowledge database to a large language model (LLM). The instructions loaded into the processor (e.g., the NPU 108) may also include code to perform, by the LLM, a hierarchical search-based comparison of the retrieved articles to provide an LLM-based identification of out-of-date articles. The instructions loaded into the processor (e.g., the NPU 108) may also include code to flag the out-of-date articles for user review. The instructions loaded into the processor (e.g., the NPU 108) may also include code to remove, in response to the user, identified out-of-date articles from the enterprise knowledge database.

Figure 2:
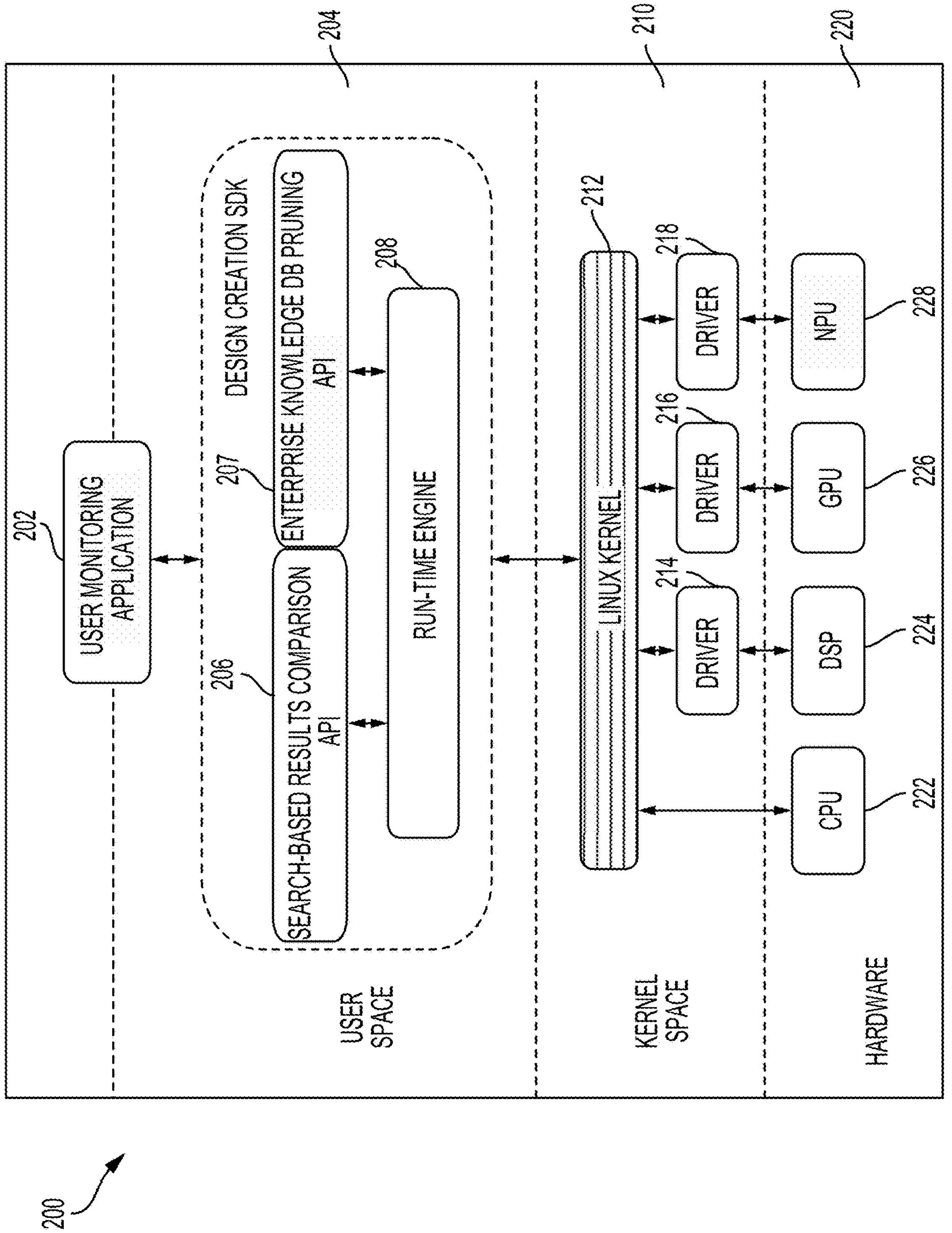
FIG. 2 is a block diagram illustrating an exemplary software architecture that may modularize artificial intelligence (AI) functions for collaborative knowledge management pruning, according to aspects of the present disclosure.

FIG. 2 is a block diagram illustrating a software architecture 200 that may modularize artificial intelligence (AI) functions of a knowledge management system for collaborative pruning of an enterprise knowledge database, according to aspects of the present disclosure. Using the software architecture 200, a user monitoring application 202 may be designed such that it may cause various processing blocks of an SOC 220 (for example a CPU 222, a DSP 224, a GPU 226, and/or an NPU 228) to perform supporting computations during run-time operation of the user monitoring application 202. FIG. 2 describes the software architecture 200 for a collaborative knowledge management system. It should be recognized that the collaborative knowledge management system is not limited to any specific information. According to aspects of the present disclosure, the user monitoring and the collaborative knowledge management pruning functionality is applicable to any type of information management activity.

The user monitoring application 202 may be configured to call functions defined in a user space 204 that may, for example, provide collaborative pruning services for an enterprise knowledge database. The user monitoring application 202 may make a request for compiled program code associated with a library defined in a search-based results comparison application programming interface (API) 206. The search-based results comparison API 206 is configured to perform a hierarchical search-based comparison of the retrieved articles from the enterprise knowledge database to provide a large language model (LLM)-based identification of out-of-date articles.

In response, compiled program code of an enterprise knowledge database pruning API 207 is configured to flag the out-of-date articles for user review. Additionally, the enterprise knowledge database pruning API 207 is configured to remove user confirmed out-of-date articles from the enterprise knowledge database.

A run-time engine 208, which may be compiled code of a run-time framework, may be further accessible to the user monitoring application 202. The user monitoring application 202 may cause the run-time engine 208, for example, to perform actions for reviewing documents that may appear in user search results. In response to document identification, the run-time engine 208 may in turn send a signal to an operating system 210, such as a Linux Kernel 212, running on the SOC 220. FIG. 2 illustrates the Linux Kernel 212 as software architecture for a collaborative knowledge management system. It should be recognized, however, that aspects of the present disclosure are not limited to this exemplary software architecture. For example, other kernels may provide the software architecture to support the collaborating enterprise database pruning functionality.

The operating system 210, in turn, may cause a computation to be performed on the CPU 222, the DSP 224, the GPU 226, the NPU 228, or some combination thereof. The CPU 222 may be accessed directly by the operating system 210, and other processing blocks may be accessed through a driver, such as drivers 214-218 for the DSP 224, for the GPU 226, or for the NPU 228. In the illustrated example, the deep neural network may be configured to run on a combination of processing blocks, such as the CPU 222 and the GPU 226, or may be run on the NPU 228 if present.

As noted above, a frequent problem in enterprise knowledge management is pruning out-of-date information. It is common for companies to aggregate substantial amounts of human-written knowledge articles (e.g., in the form of a knowledge management database). Over time, some articles fall out of date and are no longer true due to changes in the products or organization. For example, a software API may change, and old documents that reference that API may become out of date. Identifying old/out-of-date information can be time intensive and costly. Most companies do not allocate staff to knowledge management, which results in stale information remaining, causing trust in the knowledge management database to reduce over time, resulting in degraded search results. Various aspects of the present disclosure are directed to a collaborative knowledge management system that uses an LLM to prune collaborative enterprise knowledge databases, for example, as shown in FIG. 3.

Figure 3:
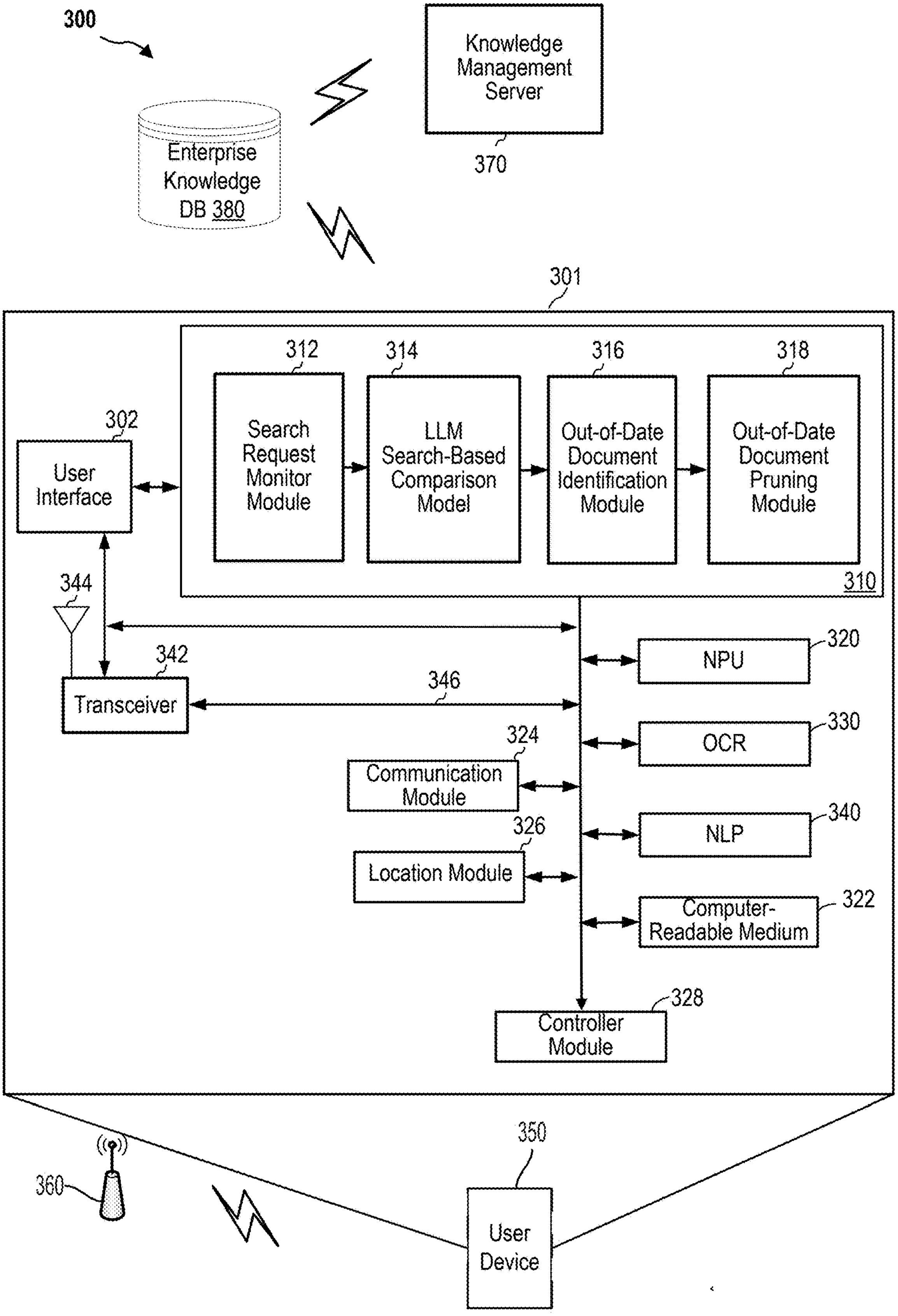
FIG. 3 is a diagram illustrating a hardware implementation for a collaborative knowledge management system, according to aspects of the present disclosure.

FIG. 3 is a diagram illustrating a hardware implementation for a collaborative knowledge management system 300, according to aspects of the present disclosure. The collaborative knowledge management system 300 may be configured to utilize a large language model (LLM) to prune an enterprise knowledge database 380. The collaborative knowledge management system 300 utilizes a simple, structured, and prioritized collaborative knowledge management pruning method. In some implementations, the collaborative knowledge management pruning method identifies and verifies out-of-date information in the enterprise knowledge database 380. In these implementations, the collaborative knowledge management system 300 analyzes articles returned as a part of a search (e.g., document analysis is focused on searched documents rather than the entire article corpus of the enterprise knowledge database 380) and utilizes an LLM search-based comparison model 314 to perform an automated comparison of two articles for consistency.

The collaborative knowledge management system 300 includes a user monitoring system 301 and a knowledge management server 370 in this aspect of the present disclosure. The user monitoring system 301 may be a component of a user device 350. The user device 350 may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a Smartbook, an Ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a global positioning system device, or any other suitable device that is configured to communicate via a wireless or wired medium.

The knowledge management server 370 may connect to the user device 350 for monitoring user search queries and focus analysis on the articles returned as a part of a search. According to various aspects of the present disclosure, document analysis is focused on searched documents rather than the entire article corpus of the enterprise knowledge database 380. In some implementations, the knowledge management server 370 utilizes an LLM to perform an automated comparison of two articles for consistency. If out-of-date articles are identified, the knowledge management server 370 identifies the article with the earlier creation date (e.g., origination date or created-on date) or edited-on date and marks the out-of-date article with a flag to indicate that the out-of-date article should be reviewed for potential pruning from the enterprise knowledge database 380.

In various aspects of the present disclosure, the identification of out-of-date articles is contrasted with utilizing other information available for prioritizing which article is likely to be "true." For instance, there may be some documents that are "established ground truth" (e.g., labeled by the users as such, and assumed to always be true by the collaborative knowledge management system 300). Similarly, the LLM search-based comparison model 314 is trained with knowledge of what is "true". For instance, facts that are available in the LLM search-based comparison model 314, like the dates of significant world, events, the boiling point of water, etc., are assumed as "true". Additionally, an organization may want to use custom business logic, using their own criteria for prioritizing which article is likely to be "true" (e.g., not out-of-date).

According to these examples, an article that contradicts an article that is identified as likely "true" enables a system to determine which of two contradictory articles is "true" and the other article identified as out-of-date. Additionally, when comparing two articles, because we are comparing two articles, the two article may be "contradictory." According to various aspects of the present disclosure, a collaborative knowledge management pruning process operates by: (1) finding contradictory articles; and 2) determining which is likely out-of-date and which is likely correct (e.g., more correct). In this example, the collaborative knowledge management pruning process the document that is out-of-date is identified for pruning.

The user monitoring system 301 may be implemented with an interconnected architecture, represented by an interconnect 346, which may be implemented as a controller area network (CAN). The interconnect 346 may include any number of point-to-point interconnects, buses, and/or bridges depending on the specific application of the user monitoring system 301 and the overall interactive persona design constraints. The interconnect 346 links together various circuits including one or more processors and/or hardware modules, represented by a user interface 302, a user activity module 310, a neural network processor (NPU) 320, a computer-readable medium 322, a communication module 324, a location module 326, a controller module 328, an optical character recognition (OCR) 330, and a natural language processor (NLP) 340. The interconnect 346 may also link various other circuits such as timing sources, peripherals, voltage regulators, and power management circuits, which are well known in the art, and therefore, will not be described any further.

The user monitoring system 301 includes a transceiver 342 coupled to the user interface 302, the user activity module 310, the NPU 320, the computer-readable medium 322, the communication module 324, the location module 326, the controller module 328, the OCR 330, and NLP 340. The transceiver 342 is coupled to an antenna 344. The transceiver 342 communicates with various other devices over a transmission medium. For example, the transceiver 342 may receive commands via transmissions from a user. In this example, the transceiver 342 may receive/transmit information for the user activity module 310 to/from connected devices within the vicinity of the user device 350.

The user monitoring system 301 includes the NPU 320, the OCR 330, and the NLP 340 coupled to the computer-readable medium 322. The NPU 320, the OCR 330, and NLP 340 performs processing, including the execution of software stored on the computer-readable medium 322 to provide a neural network model (e.g., a large language model (LLM)) to prune the enterprise knowledge database 380, according to various aspects of the present disclosure. The software, when executed by the NPU 320, the OCR 330 and the NLP 340, causes the user monitoring system 301 to perform the various functions described for pruning the enterprise knowledge database 380 based on out-of-date articles presented to the user through the user device 350, or any of the modules (e.g., 310, 324, 326, and/or 328). The computer-readable medium 322 may also be used for storing data that is manipulated by the OCR 330 and the NLP 340 when executing the software to analyze user communications.

The location module 326 may determine a location of the user device 350. For example, the location module 326 may use a global positioning system (GPS) to determine the location of the user device 350. The location module 326 may implement a dedicated short-range communication (DSRC)-compliant GPS unit. A DSRC-compliant GPS unit includes hardware and software to make the user device 350 and/or the location module 326 compliant with the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); and EN ISO 14906:2004 Electronic Fee Collection-Application interface.

The communication module 324 may facilitate communications via the transceiver 342. For example, the communication module 324 may be configured to provide communication capabilities via different wireless protocols, such as 5G new radio (NR), Wi-Fi, long term evolution (LTE), 4G, 3G, etc. The communication module 324 may also communicate with other components of the user device 350 that are not modules of the user monitoring system 301. The transceiver 342 may be a communications channel through a network access point 360. The communications channel may include DSRC, LTE, LTE-D2D, mmWave, Wi-Fi (infrastructure mode), Wi-Fi (ad-hoc mode), visible light communication, TV white space communication, satellite communication, full-duplex wireless communications, or any other wireless communications protocol such as those mentioned herein.

The user monitoring system 301 also includes the OCR 330 and the NLP 340 to automatically detect search results displayed on the user's workspace from the enterprise knowledge database 380. The user monitoring system 301 may follow a process to detect and determine whether the detected search results include out-of-date articles. When the user performs a search from the enterprise knowledge database 380, the user monitoring system 301 utilizes the OCR 330 and/or the NLP 340 to analyze the search results displayed on the user's workspace.

The user activity module 310 may be in communication with the user interface 302, the NPU 320, the computer-readable medium 322, the communication module 324, the location module 326, the controller module 328, the OCR 330, the NLP 340, and the transceiver 342. In one configuration, the user activity module 310 monitors search results displayed on the user interface 302. The user interface 302 may monitor user communications to and from the communication module 324. According to aspects of the present disclosure, the OCR 330 and the NLP 340 automatically detect search displayed on the user's workspace and may use computer vision object detection and instance segmentation techniques.

As shown in FIG. 3, the user activity module 310 includes a search request monitor module 312, the LLM search-based comparison model 314, an out-of-date document identification module 316, and an out-of-date document pruning module 318. The search request monitor module 312, the LLM search-based comparison model 314, the out-of-date document identification module 316, and the out-of-date document pruning module 318 may be components of a same or different artificial neural network (ANN). The user activity module 310 is not limited to an ANN. The user activity module 310 enables a collaborative knowledge management pruning process for removal of out-of-date information from the enterprise knowledge database 380, with significantly reduced labor intensity than conventional document pruning. Moreover, the accuracy, value, and trust of the collaborative knowledge management system 300 is significantly improved.

This configuration of the user activity module 310 includes the search request monitor module 312 configured to feed, in response to a user search request, retrieved articles from the enterprise knowledge database 380 to a large language model (LLM). For example, the search request monitor module 312 may generate an LLM-based query including the retrieved articles from the enterprise knowledge database 380. In some implementations, the LLM-based query including the retrieved articles from the enterprise knowledge database 380 is fed to the LLM search-based comparison model 314.

In various aspects of the present disclosure, the user activity module 310 includes the LLM search-based comparison model 314 configured to perform a hierarchical search-based comparison of the retrieved articles to provide an LLM-based identification of out-of-date articles. In some implementations, the enterprise knowledge database 380 retrieves a set of N articles or entries based on the user search request. In these implementations, the LLM search-based comparison model 314 performs an LLM-based comparison to analyze the top two returned articles (which may be hierarchically arranged based on relevance/rank) to determine if they are out-of-date.

In this example, the user activity module 310 also includes the out-of-date document identification module 316 configured to flag the out-of-date articles for user review. In some implementations, if out-of-date articles are identified, the out-of-date document identification module 316 identifies the article with the earlier creation or edited date and marks the out-of-date article with a flag to indicate that the out-of-date article should be reviewed for potential pruning.

As further shown in FIG. 3, the user activity module 310 includes the out-of-date document pruning module 318 configured to remove, in response to the user, identified out-of-date articles from the enterprise knowledge database 380. In operation, when a user selects a potentially out-of-date article, the out-of-date document pruning module 318 retrieves the potentially out-of-date article, along with (1) a warning indicating that the article may be out-of-date and (2) a link for the paired and potentially out-of-date article. In response, the user may (1) confirm that the potentially out-of-date article should be pruned or (2) dismiss the warning.

In some aspects of the present disclosure, the user activity module 310 is implemented and/or works in conjunction with the knowledge management server 370. In some aspects of the present disclosure, the collaborative knowledge management system 300 may be implemented as a web browser plugin. In other aspects of the present disclosure, the knowledge management server 370 provides an offline application that scans documents viewed through the user interface 302. In other aspects of the present disclosure, the collaborative knowledge management system 300 may be implemented as a mobile application that removes out-of-date information from the enterprise knowledge database 380, with significantly reduced labor intensity than conventional document pruning, for example, as shown in FIG. 4.

Figure 4:
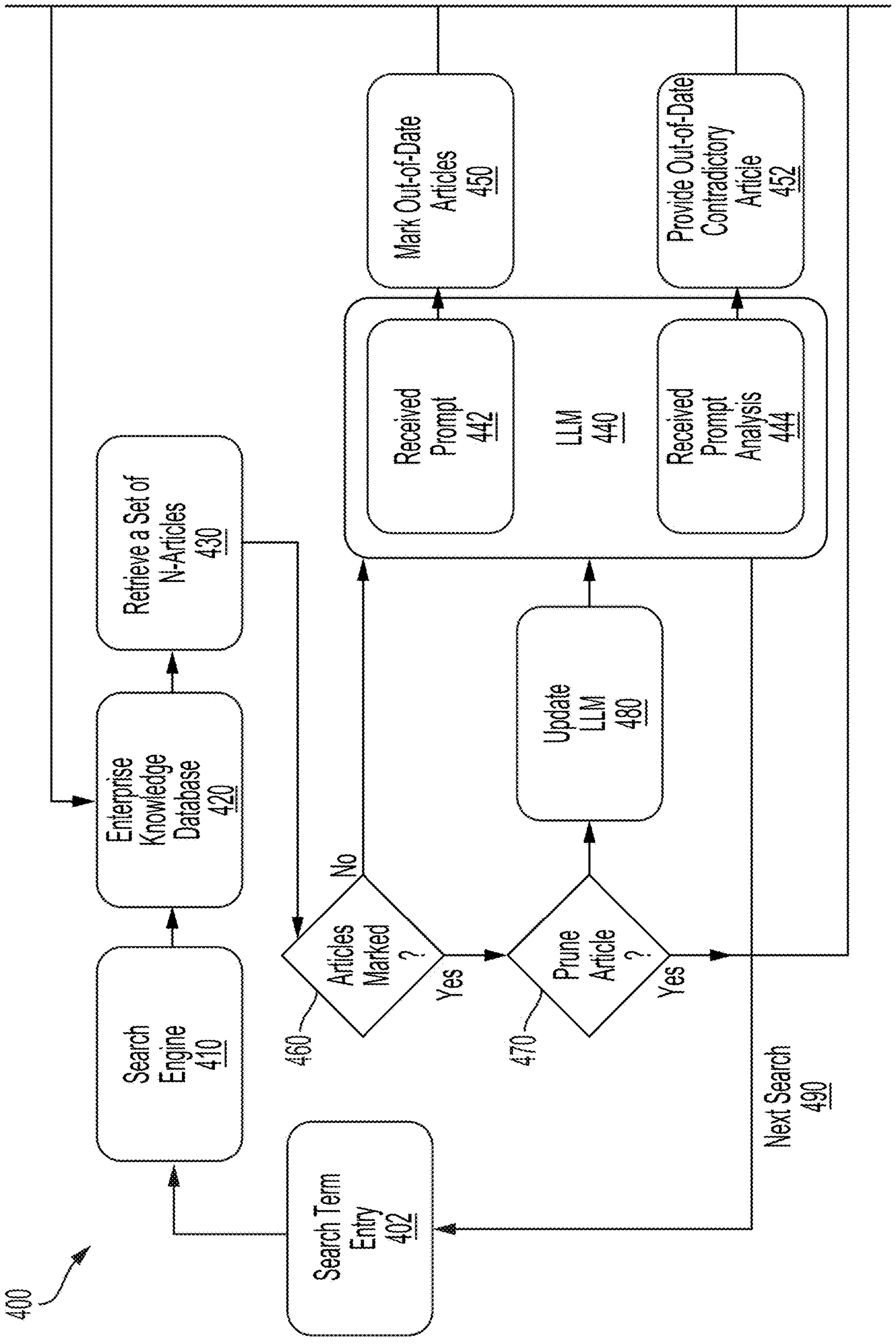
FIG. 4 is a block diagram illustrating a collaborative knowledge management system pruning process, according to various aspects of the present disclosure.

FIG. 4 is a block diagram illustrating a collaborative knowledge management pruning process 400, according to various aspects of the present disclosure. As shown in FIG. 4, the collaborative knowledge management pruning process 400 begins in response to user entry of search terms 402 into a search engine 410 of an enterprise knowledge database 420. In some implementations, a set of N-articles 430 or entries are retrieved from the enterprise knowledge database 420 by the search engine 410 based on the search term entry. In these implementations, the collaborative knowledge management pruning process 400 directs an LLM 440 utilizing a received prompt 442 to analyze the top two returned articles of the set of N-articles 430 (which may be hierarchically arranged based on relevance/rank) to determine if they are out-of-date according to a received prompt analysis 444. For example, the collaborative knowledge management pruning process 400 creates the received prompt 442 containing the content of the first two of these articles into the LLM 440 (or by selecting portions (selected chunks) of the article) and asks the LLM 440 to determine if the articles are out-of-date in any way. If a set of two out-of-date articles are identified, the collaborative knowledge management pruning process 400 identifies the article with the earlier creation or edited date and marks the out-of-date article at block 450 with a flag (e.g., flagging out-of-date articles) to indicate that the out-of-date article should be reviewed for potential pruning. Additionally, a link is provided to the contradictor article at block 452.

In operation, when a user selects an article from the set of N-article retrieved from the enterprise knowledge database, at block 460 a determination is made as to whether the selected article is marked as a potentially out-of-date article. When none of the set of N-article is marked, the set of N-article is fed to the LLM 440. Otherwise, the collaborative knowledge management pruning process 400 retrieves the potentially out-of-date article, along with (1) a warning indicating that the article may be out-of-date and (2) a link for the paired and potentially out-of-date article. In response, the user may (1) confirm that the potentially out-of-date article should be pruned or (2) dismiss the warning at block 470. If the warning is dismissed, at block 480 the LLM 440 is updated with the pruning decision. Otherwise, the article is pruned from the enterprise knowledge database 420 and a next search 490 may be performed.

In some implementations, the collaborative knowledge management pruning process 400 is performed for each pairwise set of articles in a first number, M, of returned articles (where M is less than or equal to the set of N-articles 430). The collaborative knowledge management pruning process 400 may also provide the marked articles to an engineer tasked with knowledge management to guide in examination/pruning tasks, which reduces the amount of time and effort dedicated to knowledge management. For example, a prioritized list provided to the engineer may be prioritized based on the frequency/quantity of searches and/or how many articles contradict a particular article. The collaborative knowledge management pruning process 400 may be supplemented via a "chain of reasoning" prompt by the engineer.

This implementation of the collaborative knowledge management pruning process 400 removes out-of-date information, with significantly reduced labor intensity than conventional document pruning. Moreover, the accuracy, value, and trust of the knowledge management system is significantly improved. Additionally, a person tasked with knowledge management can use the list of articles marked for review as a guide for which articles to examine for pruning, reducing the amount of time and effort required. These can be prioritized by how often the articles were searched for, and how many articles contradict the articles. In some implementation, if the knowledge manager finds that the warnings are inaccurate, they may be able to help improve the subject-matter-specific understanding of the information of the LLM 440 by using "chain of reasoning" prompting.

According to various aspects of the present disclosure, "chain of reasoning" prompting is another example of a specific way to insert subject matter expertise into the business process for determining which article is likely to be more correct for identifying contradictory (e.g., out-of-date) articles. For instance, if the enterprise knowledge database is technical (e.g., such as software API documentation), the LLM 440 could provide specific instructions through prompt engineering to analyze specific parts of each document, such as the version number, function types and arguments, release notes etc. The collaborative knowledge management pruning process 400 is further illustrated, for example, in FIG. 5.

Figure 5:
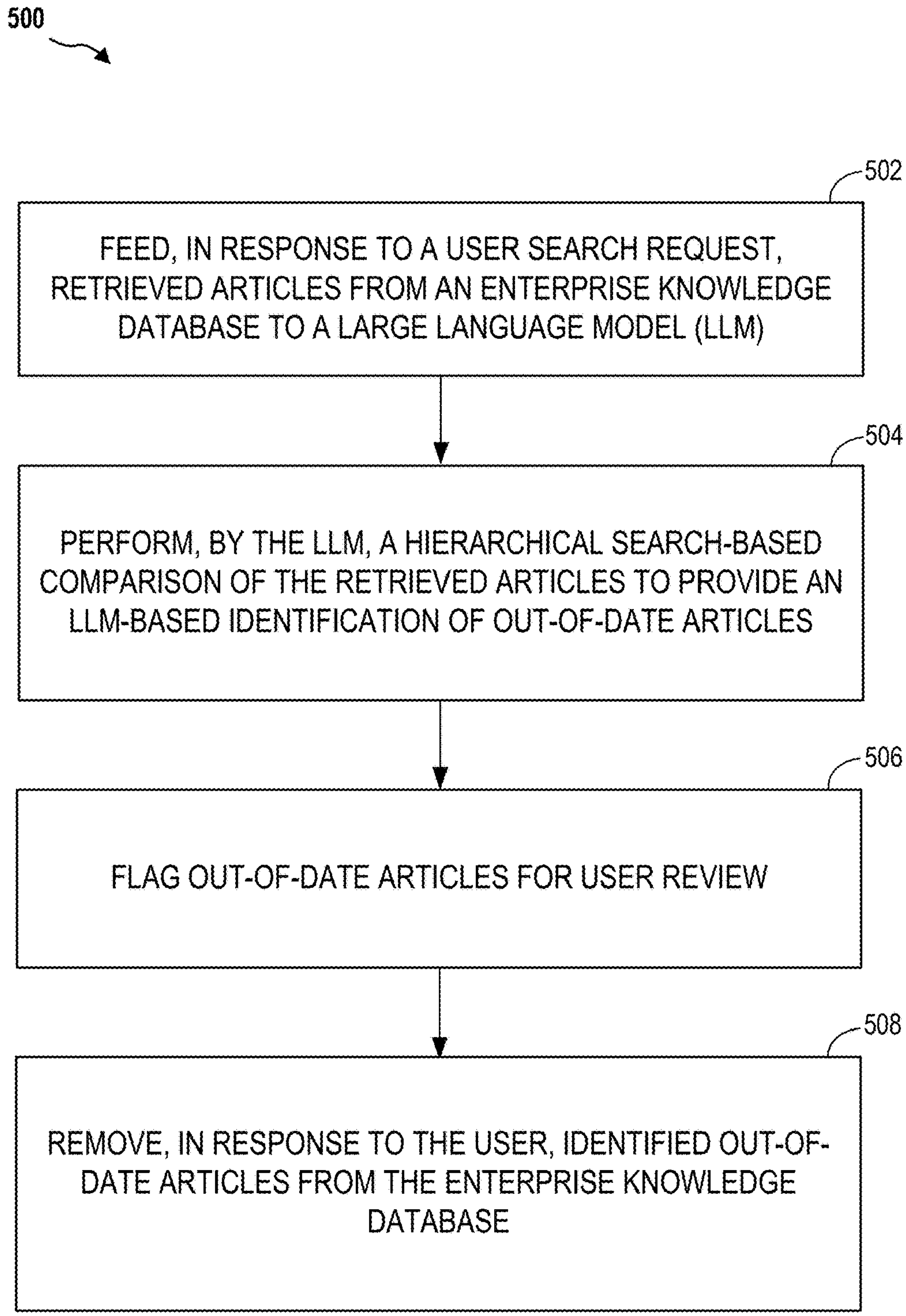
FIG. 5 is a process flow diagram illustrating a method for collaborative knowledge management pruning, according to various aspects of the present disclosure.

FIG. 5 is a process flow diagram illustrating a method 500 for collaborative knowledge management pruning, according to various aspects of the present disclosure. The method 500 begins at block 502, in which retrieved articles from an enterprise knowledge database are fed to a large language model (LLM) in response to a user search request. For example, as shown in FIG. 3, the user activity module 310 includes the search request monitor module 312 configured to feed, in response to a user search request, retrieved articles from the enterprise knowledge database 380 to a large language model (LLM). For example, the search request monitor module 312 may generate an LLM-based query including the retrieved articles from the enterprise knowledge database 380. In some implementations, the LLM-based query including the retrieved articles from the enterprise knowledge database 380 is fed to the LLM search-based comparison model 314.

At block 504, the LLM performs a hierarchical search-based comparison of the retrieved articles to provide an LLM-based identification of out-of-date articles. For example, as shown in FIG. 3, the user activity module 310 includes the LLM search-based comparison model 314 configured to perform a hierarchical search-based comparison of the retrieved articles to provide an LLM-based identification of out-of-date articles. In some implementations, the enterprise knowledge database 380 retrieves a set of N articles or entries based on the user search request. In these implementations, the LLM search-based comparison model 314 performs an LLM-based comparison to analyze the top two returned articles (which may be hierarchically arranged based on relevance/rank) to determine if they are out-of-date.

At block 506, out-of-date articles are flagged for user review. For example, as shown in FIG. 3, the user activity module 310 includes the out-of-date document identification module 316 configured to flag the out-of-date articles for user review. In some implementations, if out-of-date articles are identified, the out-of-date document identification module 316 identifies the article with the earlier creation or edited date and marks the out-of-date article with a flag to indicate that the out-of-date article should be reviewed for potential pruning.

At block 508, identified out-of-date articles remove from the enterprise knowledge database in response to the user. For example, as shown in FIG. 3, the user activity module 310 includes the out-of-date document pruning module 318 configured to remove, in response to the user, identified out-of-date articles from the enterprise knowledge database 380. In operation, when a user selects a potentially out-of-date article, the out-of-date document pruning module 318 retrieves the potentially out-of-date article, along with (1) a warning indicating that the article may be out-of-date and (2) a link for the paired and potentially out-of-date article. In response, the user may (1) confirm that the potentially out-of-date article should be pruned or (2) dismiss the warning. The method 500 is also further illustrated in the collaborative knowledge management pruning process 400 shown in FIG. 4.

The various operations of methods described above may be performed by any suitable means capable of performing the corresponding functions. The means may include various hardware and/or software component(s) and/or module(s), including, but not limited to, a circuit, an application-specific integrated circuit (ASIC), or processor. Where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database, or another data structure), ascertaining, and the like. Additionally, "determining" may include receiving (e.g., receiving information), accessing (e.g., accessing data in a memory), and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor configured according to the present disclosure, a digital signal processor (DSP), an ASIC, a field-programmable gate array signal (FPGA) or other programmable logic device (PLD), discrete gate or transistor logic, discrete hardware components, or any combination thereof designed to perform the functions described herein. The processor may be a microprocessor, but, in the alternative, the processor may be any commercially available processor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read-only memory (ROM), flash memory, erasable programmable read-only memory (EPROM), electrically erasable programmable read-only memory (EEPROM), registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may connect a network adapter, among other things, to the processing system via the bus. The network adapter may implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Examples of processors that may be specially configured according to the present disclosure include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM, flash memory, ROM, programmable read-only memory (PROM), EPROM, EEPROM, registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such with cache and/or specialized register files. Although the various components discussed may be described as having a specific location, such as a local component, they may also be configured in several ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an ASIC with the processor, the bus interface, the user interface, supporting circuitry, and at least a portion of the machine-readable media integrated into a single chip, or with one or more FPGAs, PLDs, controllers, state machines, gated logic, discrete hardware components, or any other suitable circuitry, or any combination of circuits that can perform the various functions described throughout this present disclosure. Those skilled in the art will recognize how best to implement the described functionality for the processing system depending on the application and the overall design constraints imposed on the overall system.

The machine-readable media may comprise several software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium. Computer-readable media include both computer storage media and communication media, including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects, computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for collaborative knowledge management pruning, the method comprising:
- feeding, in response to a user search request, retrieved articles from an enterprise knowledge database to a large language model (LLM);
- performing, by the LLM, a hierarchical search-based comparison of the retrieved articles according to a technical subject-matter-specific LLM understanding based on previous chain-of-reasoning prompting to provide an LLM-based identification of flagged contradictory articles;
- marking confirmed contradictory articles having a later origination date for human pruning review;
- automatically removing out-of-date, confirmed contradictory articles having an earlier origination date from the enterprise knowledge database;
- removing, in response to the user, marked, contradictory articles from the enterprise knowledge database; and
- updating, through subsequent chain of reasoning prompting, the technical subject-matter-specific LLM understanding of the enterprise knowledge database when the user determines a contradictory article warning is inaccurate.

2. The method of claim 1, in which feeding comprises:
- generating a prompt containing a content of a first two of the retrieved articles;
- comparing the content of the first two of the retrieved articles to determine whether the first two of the retrieved articles are contradictory; and
- asking the LLM to determine which of the first two of the retrieved articles are out-of-date when the first two of the retrieved articles are contradictory.

3. The method of claim 2, in which generating the prompt comprises selecting portions of the first two of the retrieved articles as the content.

4. The method of claim 1, in which flagging comprises providing a link to the out-of-date article.

5. The method of claim 1, in which performing the hierarchical search-based comparison comprises comparing each pairwise set in a first M of the N retrieved articles, in which M is less than or equal to the N retrieved articles in response to the user search request.

6. The method of claim 1, in which flagging comprises placing the contradictory article warning at a top of each identified out-of-date article.

7. The method of claim 1, further comprising generating a prioritized list based on a frequency/quantity of searches for an out-of-date article and/or how many articles contradict the out-of-date article.

8. A non-transitory computer-readable medium having program code recorded thereon for collaborative knowledge management pruning, the program code being executed by a processor and comprising:
- program code to feed, in response to a user search request, retrieved articles from an enterprise knowledge database to a large language model (LLM);
- program code to perform, by the LLM, a hierarchical search-based comparison of the retrieved articles according to a technical subject-matter-specific LLM understanding based on previous chain-of-reasoning prompting to provide an LLM-based identification of flagged contradictory articles;
- program code to mark confirmed contradictory articles having a later origination date for human pruning review;
- program code to automatically remove out-of-date, confirmed contradictory articles having an earlier origination date from the enterprise knowledge database;
- program code to remove, in response to the user, marked, contradictory articles from the enterprise knowledge database; and
- program code to update, through subsequent chain of reasoning prompting, the technical subject-matter-specific LLM understanding of the enterprise knowledge database when the user determines a contradictory article warning is inaccurate.

9. The non-transitory computer-readable medium of claim 8, in which the program code to feed comprises:
- program code to generate a prompt containing a content of a first two of the retrieved articles;
- program code to compare the content of the first two of the retrieved articles to determine whether the first two of the retrieved articles are contradictory; and
- program code to ask the LLM to determine which of the first two of the retrieved articles are out-of-date when the first two of the retrieved articles are contradictory.

10. The non-transitory computer-readable medium of claim 9, in which the program code to generate the prompt comprises program code to select portions of the first two of the retrieved articles as the content.

11. The non-transitory computer-readable medium of claim 8, in which the program code to flag comprises program code to provide a link to the out-of-date article.

12. The non-transitory computer-readable medium of claim 8, in which the program code to perform the hierarchical search-based comparison comprises program code to compare each pairwise set in a first M of the N retrieved articles, in which M is less than or equal to the N retrieved articles in response to the user search request.

13. The non-transitory computer-readable medium of claim 8, in which the program code to flag comprises program code to place the contradictory article warning at a top of each identified out-of-date article.

14. The non-transitory computer-readable medium of claim 8, further comprising program code to generate a prioritized list based on a frequency/quantity of searches for an out-of-date article and/or how many articles contradict the out-of-date article.

15. A system for collaborative knowledge management pruning, the system comprising:

a search request monitor module to feed, in response to a user search request, retrieved articles from an enterprise knowledge database to a large language model (LLM);

an LLM search-based comparison model to perform a hierarchical search-based comparison of the retrieved articles according to a technical subject-matter-specific LLM understanding based on previous chain-of-reasoning prompting to provide an LLM-based identification of flagged contradictory articles;

and an out-of-date document pruning module to automatically remove out-of-date, confirmed contradictory articles having an earlier origination date from the enterprise knowledge database and to remove, in response to the user, marked, contradictory articles from the enterprise knowledge database and to update, through subsequent chain of reasoning prompting, the technical subject-matter-specific LLM understanding of the enterprise knowledge database when the user determines a contradictory article warning is inaccurate.

16. The system of claim 15, in which the out-of-date document identification module is further to provide a link to the out-of-date article.

17. The system of claim 15, in which the LLM search-based comparison model is further to compare each pairwise set in a first M of the N retrieved articles, in which M is less than or equal to the N retrieved articles in response to the user search request.

18. The system of claim 15, in which the out-of-date document identification module is further to place a warning at a top of each identified out-of-date article.

* * * * *